US010723433B2

(12) United States Patent
Woodworth et al.

(10) Patent No.: US 10,723,433 B2
(45) Date of Patent: *Jul. 28, 2020

(54) ASSEMBLY SYSTEMS AND METHODS FOR UNMANNED AERIAL VEHICLES

(71) Applicant: Wing Aviation LLC, Mountain View, CA (US)

(72) Inventors: Adam Woodworth, San Jose, CA (US); Adem Rudin, Mountain View, CA (US); Stephen Benson, San Carlos, CA (US); James Schmalzried, San Jose, CA (US); Kyle Liske, San Francisco, CA (US); Jesse Blake, Sunnyvale, CA (US); André Prager, Sunnyvale, CA (US); Nicolas Renold, Mountain View, CA (US); Thorsten Schilling, Cupertino, CA (US)

(73) Assignee: Wing Aviation LLC, Mountain View, CA (US)

( * ) Notice: Subject to any disclaimer, the term of this patent is extended or adjusted under 35 U.S.C. 154(b) by 190 days.

This patent is subject to a terminal disclaimer.

(21) Appl. No.: 15/823,114

(22) Filed: Nov. 27, 2017

(65) Prior Publication Data

US 2019/0161153 A1    May 30, 2019

(51) Int. Cl.
*B64C 1/06* (2006.01)
*B64C 1/16* (2006.01)
(Continued)

(52) U.S. Cl.
CPC .............. *B64C 1/061* (2013.01); *B64C 1/16* (2013.01); *B64C 3/185* (2013.01); *B64C 3/26* (2013.01);
(Continued)

(58) Field of Classification Search
CPC ...... B64C 1/068; B64C 1/069; B64C 29/0016; B64C 29/0025; B64C 2201/027; B64C 3/26
See application file for complete search history.

(56) References Cited

U.S. PATENT DOCUMENTS 1,425,555 A    8/1922   Thompson
2,157,045 A    5/1939   Wiese
(Continued)

FOREIGN PATENT DOCUMENTS

CA    2963502 A1 * 10/2018 ......... B64C 29/0025
DE    202014004877 U1 * 7/2014 ......... B64C 29/0025
(Continued)

OTHER PUBLICATIONS

Zoukei-mura, Horten Ho-229 Super Wing Series 1/48 No. 3 manual, Aug. 2015 https://www.zoukeimura.co.jp/en/products/sws48_03_ ho229.html (Year: 2015).*
(Continued)

*Primary Examiner* — Assres H Woldemaryam
(74) *Attorney, Agent, or Firm* — Christensen O'Connor Johnson Kindness PLLC

(57) ABSTRACT

Systems and methods for assembling Unmanned Autonomous Vehicle (UAV) are disclosed herein. In one embodiment, a method for assembling a UAV includes connecting a wing spar with boom carriers to form an H-frame. The wing spar provides mounting locations for securing horizontal propulsion units, and the boom carriers provide mounting locations for securing vertical propulsion units. The method also includes attaching a fuselage body to the wing spar; attaching a pre-formed wing shell to the H-frame; and attaching pre-formed individual boom shells to their corresponding boom carriers. The H-frame provides structural frame for mounting the wing shell and the boom shells.

26 Claims, 10 Drawing Sheets

(51) Int. Cl.
  *B64C 3/18* (2006.01)
  *B64C 3/32* (2006.01)
  *B64C 39/02* (2006.01)
  *B64C 3/26* (2006.01)

(52) U.S. Cl.
  CPC .............. *B64C 3/32* (2013.01); *B64C 39/024* (2013.01); *B64C 2201/00* (2013.01); *B64C 2211/00* (2013.01)

(56) References Cited

U.S. PATENT DOCUMENTS

| | | | |
|---|---|---|---|
| 2,273,919 A * | 2/1942 | Allward | B64C 3/26 244/123.14 |
| 2,511,504 A | 6/1950 | Hawkins | |
| 2,994,493 A * | 8/1961 | Hartman | B64C 39/066 244/12.6 |
| 3,219,123 A | 11/1965 | Horst | |
| 3,856,238 A | 12/1974 | Malvestuto, Jr. | |
| 4,979,698 A | 12/1990 | Lederman | |
| 6,293,491 B1 | 9/2001 | Wobben | |
| 6,843,447 B2 | 1/2005 | Morgan | |
| 7,159,817 B2 | 1/2007 | VanderMey et al. | |
| 7,237,750 B2 | 7/2007 | Chiu et al. | |
| 8,152,096 B2 | 4/2012 | Smith | |
| 8,256,715 B2 | 9/2012 | Ballard et al. | |
| 8,393,564 B2 | 3/2013 | Kroo | |
| 8,925,870 B1 * | 1/2015 | Gordon | B64C 3/28 244/200 |
| 9,045,226 B2 | 6/2015 | Piasecki et al. | |
| 9,120,560 B1 | 9/2015 | Armer et al. | |
| 9,205,922 B1 | 12/2015 | Bouwer | |
| 9,242,738 B2 | 1/2016 | Kroo | |
| 9,522,725 B2 | 12/2016 | Torre | |
| 9,586,683 B1 | 3/2017 | Buchmueller et al. | |
| 9,623,969 B2 | 4/2017 | Nelson | |
| 9,688,400 B2 | 6/2017 | Hutson | |
| 9,988,985 B2 * | 6/2018 | Amarasinghe | F02C 7/32 |
| 10,053,213 B1 | 8/2018 | Tu | |
| 10,351,235 B2 | 7/2019 | Karem et al. | |
| 10,364,036 B2 | 7/2019 | Tighe et al. | |
| 10,479,496 B2 | 11/2019 | Gamble et al. | |
| 2003/0062443 A1 | 4/2003 | Wagner et al. | |
| 2003/0085319 A1 | 5/2003 | Wagner et al. | |
| 2008/0210809 A1 | 9/2008 | Arlton et al. | |
| 2010/0123042 A1 | 5/2010 | Ballard et al. | |
| 2010/0163669 A1 * | 7/2010 | Im | B64C 1/0009 244/36 |
| 2011/0315806 A1 | 12/2011 | Piasecki et al. | |
| 2012/0056041 A1 | 3/2012 | Rhee et al. | |
| 2013/0092799 A1 | 4/2013 | Tian et al. | |
| 2014/0061376 A1 | 3/2014 | Fisher et al. | |
| 2014/0131510 A1 | 5/2014 | Wang et al. | |
| 2014/0263823 A1 | 9/2014 | Wang et al. | |
| 2015/0298800 A1 | 10/2015 | Yoon | |
| 2016/0129998 A1 | 5/2016 | Welsh et al. | |
| 2016/0130000 A1 | 5/2016 | Rimanelli | |
| 2016/0207625 A1 | 7/2016 | Judas et al. | |
| 2016/0236774 A1 | 8/2016 | Niedzballa | |
| 2016/0297520 A1 * | 10/2016 | Sada-Salinas | B64C 29/0025 |
| 2016/0347447 A1 | 12/2016 | Judas et al. | |
| 2017/0106978 A1 | 4/2017 | Sopper et al. | |
| 2017/0210486 A1 | 7/2017 | O'Brien et al. | |
| 2017/0225779 A1 | 8/2017 | Gamble | |
| 2017/0300065 A1 | 10/2017 | Douglas et al. | |
| 2018/0079483 A1 * | 3/2018 | Ivans | B64C 3/26 |
| 2018/0273158 A1 * | 9/2018 | Courtin | B64C 1/26 |
| 2019/0084684 A1 | 3/2019 | Eller | |
| 2019/0161185 A1 * | 5/2019 | Woodworth | B64C 39/024 |

FOREIGN PATENT DOCUMENTS

| | | |
|---|---|---|
| EP | 3 162 705 A1 | 5/2017 |
| GB | 2 505 942 A | 3/2014 |
| WO | 2016/193512 A1 | 12/2016 |
| WO | 2017/066748 A1 | 4/2017 |

OTHER PUBLICATIONS

Chris Hofmann, Wing Assembly, Oct. 31, 2013 https://www.youtube.com/watch?v=2zuy8Hg9p34&list=TLPQMTkxMTIwMTmGDB5Wjl91AQ&index=2 (Year: 2013).*

TheRcSaylors, RISE Vusion 250 Race Drone Crash & Repair, Dec. 22, 2016 https://www.youtube.com/watch?v=f9fmnWTopF8 (Year: 2016).*

E-Turbine 250 LED FPV Racing Drone (ARF), Retrieved from Internet: <https://hobbyking.com/en_us/e-turbine-led-fpv-250-guadracer.html> on Oct. 5, 2017, 6 pages.

International Search Report and Written Opinion dated Feb. 28, 2019, issued in corresponding International Application No. PCT/US2018/062453, filed Nov. 26, 2018, 20 pages.

Non-Final Office Action dated Sep. 23, 2019, in U.S. Appl. No. 15/823,129, filed Nov. 27, 2017, 16 pages.

Final Office Action dated Nov. 27, 2017, in U.S. Appl. No. 15/823,129, filed Nov. 27, 2017, 16 pages.

* cited by examiner

CROSS SECTION 5-5

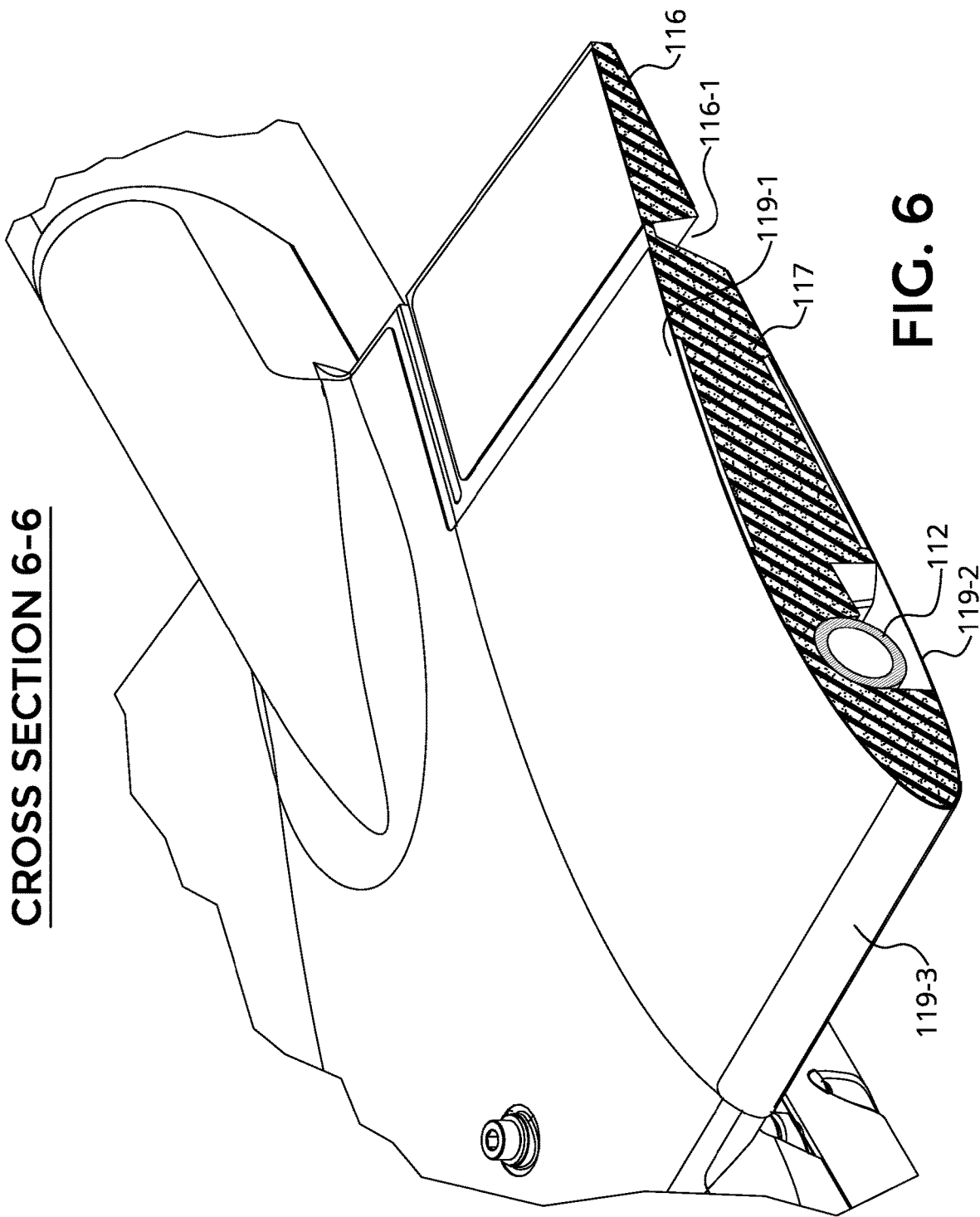

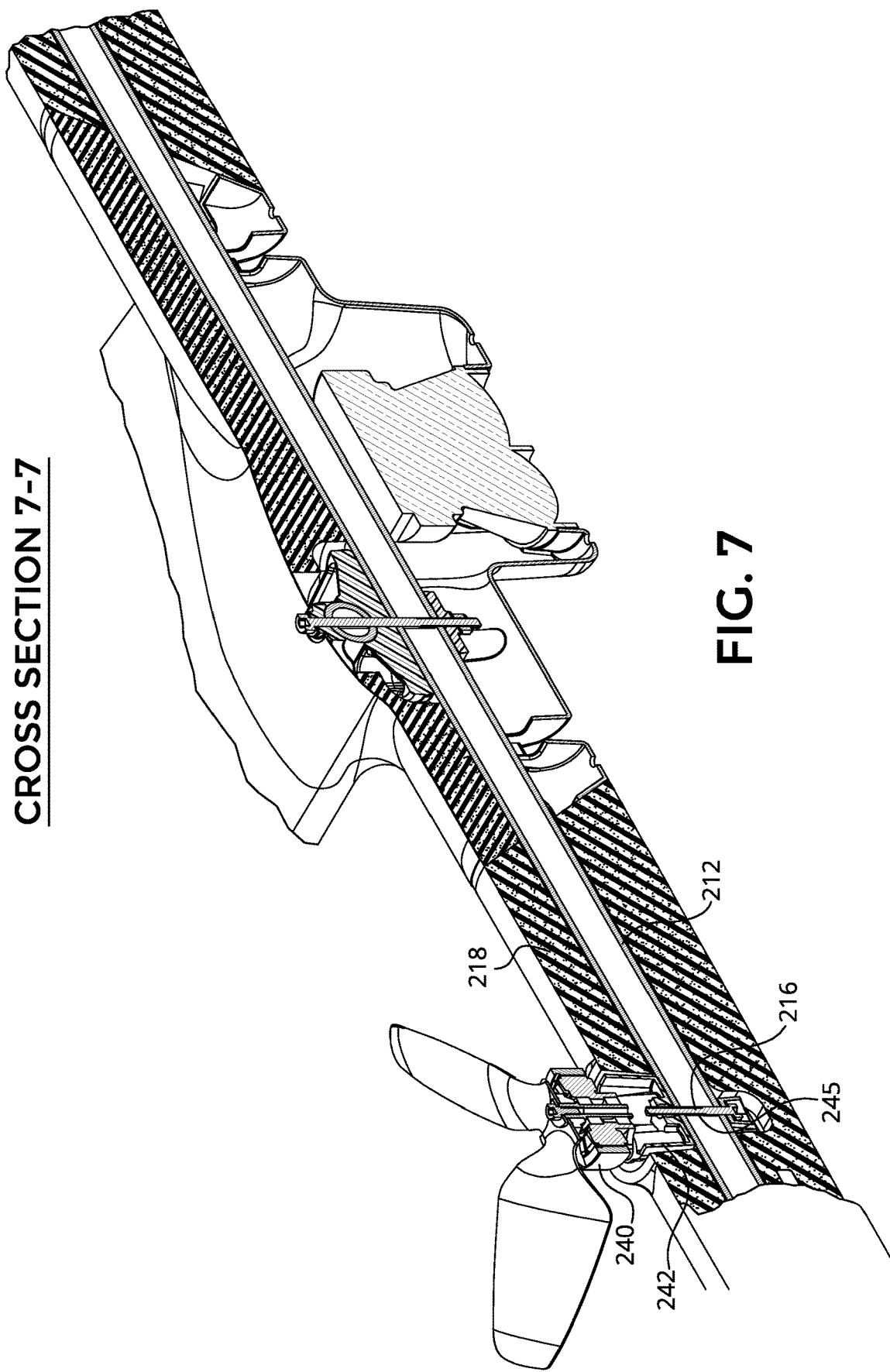

ASSEMBLY SYSTEMS AND METHODS FOR UNMANNED AERIAL VEHICLES

CROSS REFERENCE TO RELATED APPLICATIONS

The present application is related to a U.S. Application entitled "Wing Structure and Attachment to Frame for Unmanned Aerial Vehicle," U.S. application Ser. No. 15/823,129 filed Nov. 27, 2017.

BACKGROUND

An unmanned vehicle, which may also be referred to as an autonomous vehicle, is a vehicle capable of travel without a physically-present human operator on board. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle by commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for different environments. For instance, unmanned vehicles may operate in the air, on the ground, underwater, or in space. Examples include quad-copters and tail-sitter unmanned aerial vehicles (UAVs), among others. Some unmanned vehicles operate in multi-environment operation. Examples of such hybrid unmanned vehicles include an amphibious craft that is capable of operation on land as well as on water, or a floatplane that is capable of landing on water as well as on land. Other examples are also possible.

Some conventional UAVs include an inner structural frame and an outer shell. The structural frame is built using a relatively strong, but also relatively heavy material (e.g., steel, aluminum, hard plastic, etc.), while the outer shell is made of a lighter filler material (e.g., closed cell foam or other light polymer). Typically, the structural frame is surrounded by the outer shell material.

With some conventional technologies, the structural frame is assembled or manufactured first. Next, the outer shell (e.g., closed cell foam) is sprayed onto the frame to give a shape to the UAV. The excess outer shell material is cut away to make room for cables, engines, avionics, and other subassemblies. However, in some cases removing the excess outer shell material may be difficult and time consuming, thus decreasing the efficiency of the overall UAV manufacturing process.

Furthermore, the material of the frame and the material of the outer shell may have different coefficients of thermal expansion (CTE). As a result, the frame and the outer shell expand and contract at different rates as the temperature of the environment changes causing manufacturing and assembly defects. In time, different expansion rates may lead to bending of the frame, and, for a sufficiently high number of the temperature cycles, to material fatigue and fracturing of the frame.

Accordingly, there remains a need for the systems and methods for assembling UAVs having improved efficiency of the assembly and reduced stress on the structural frame.

DESCRIPTION OF THE DRAWINGS

The foregoing aspects and many of the attendant advantages of inventive technology will become more readily appreciated as the same become better understood by reference to the following detailed description, when taken in conjunction with the accompanying drawings, wherein:

FIG. 6 is a cross-sectional view 6-6 of the UAV shown in FIG. 4;

FIG. 7 is a cross-sectional view 7-7 of the UAV shown in FIG. 4;

DETAILED DESCRIPTION

While illustrative embodiments have been described, it will be appreciated that various changes can be made therein without departing from the spirit and scope of the inventive technology. Briefly, the inventive technology is directed to assembling and testing UAVs. In some embodiments, a wing spar and a boom carrier are assembled to form a structural H-frame. The wing spar and the boom carrier may be tubes made of, for example, carbon fiber, hard plastic, aluminum, or metal alloys. The wing spar and the boom carrier may have pre-drilled holes for the subsequent attachment of motor mounts.

In some embodiments, a wing shell and boom shells may be attached to the H-frame by adhesive elements (e.g., adhesive tape, double-sided adhesive tape, glue, etc.). Therefore, multiple shells are attached to the H-frame instead of having a monolithic body sprayed onto the H-frame as in the prior art. In some embodiments, the presence of the multiple shells reduces the CTE-induced stresses of the structural frame of the UAV. As a result, the UAV may have better dimensional accuracy and/or improved reliability.

Furthermore, in at least some embodiments, the same H-frame may be used with the wing shell and/or boom shells having different size and/or design, therefore improving the modularity and versatility of the UAV designs. Moreover, a fuselage of the UAV may also be modular/interchangeable. The wing shell and/or the boom shells may be made of relatively light polymers (e.g., closed cell foam) covered by the harder, but relatively thin, plastic skins.

In some embodiments of the inventive technology, UAV subsystems may be tested before the assembly of the UAV is completed. For example, components of the fuselage (e.g., avionics, battery unit, delivery units, an additional battery compartment, etc.) may be electrically tested before the fuselage is mounted to the H-frame. Furthermore, the motors and the electronics of printed circuit boards (PCBs) may also be electrically tested before the final assembly. Generally, the identification of the defective parts and subassemblies early in the assembly process lowers the overall cost and lead time of the UAV.

Figure 1:
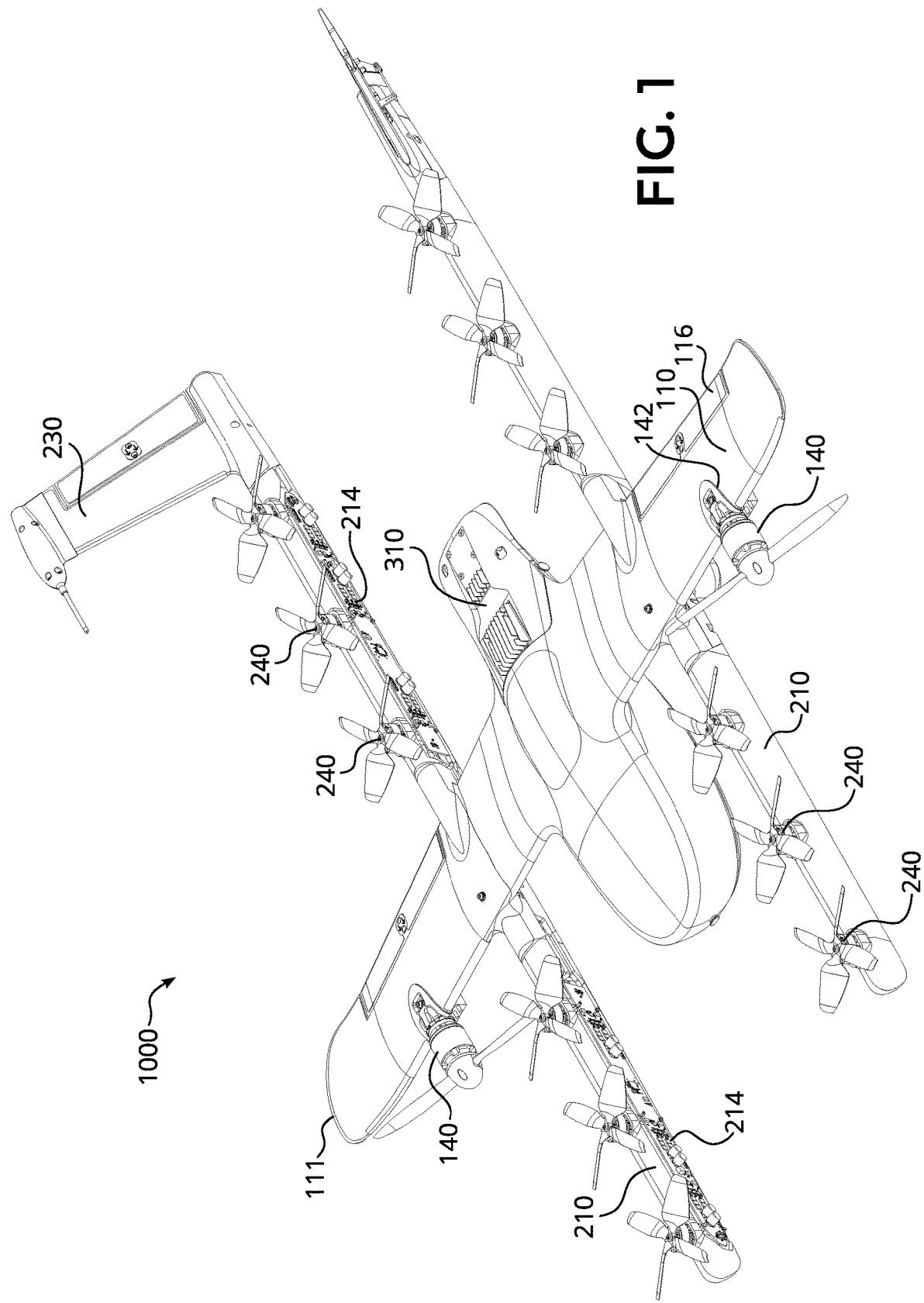
FIG. 1 is an isometric view of a UAV in accordance with an embodiment of the present technology.

FIG. 1 is an isometric view of a UAV 1000 in accordance with an embodiment of the present technology. The UAV 1000 includes a wing 110, booms 210, and a fuselage 310. In some embodiments, the wing 110 carries horizontal propulsion units 140, and the booms 210 carry vertical propulsion units 240. In operation, power for the propulsion units may be provided from a battery compartment 310-3 of the fuselage 310. In some embodiments, the fuselage 310 also includes an avionics compartment 310-1, an additional battery compartment (not shown) and/or a delivery unit 310-2 for handling the payload.

In some embodiments, the booms 210 terminate in rudders 230 for improved yaw control of the UAV 1000. The wings 110 may terminate in wing tips 111 for improved control of lift of the UAV.

The illustrated UAV 1000 includes a structural frame. Some embodiments of the structural frame are discussed with reference to FIG. 2 below.

Figure 2:
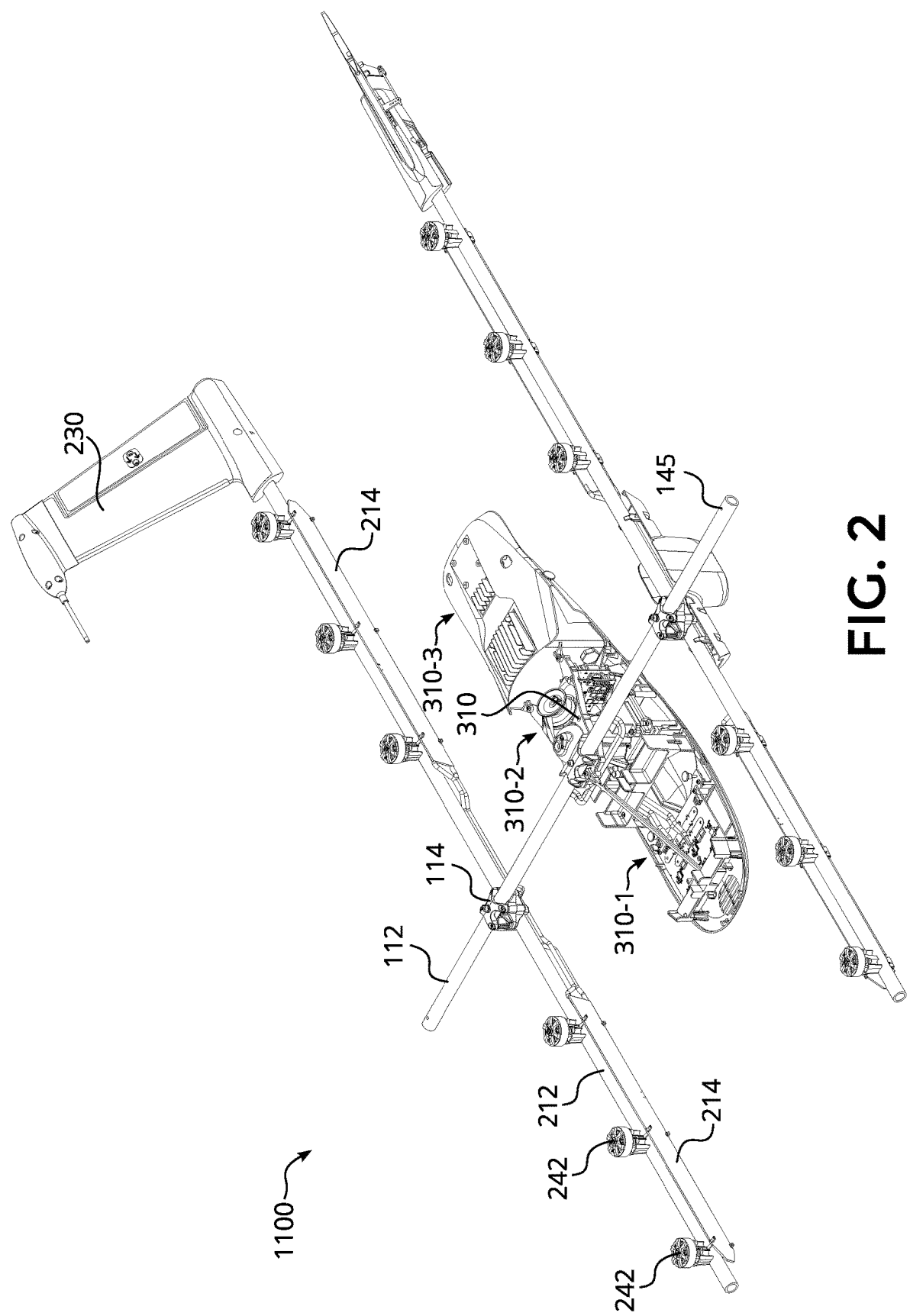
FIG. 2 is an isometric view of a frame of a UAV in accordance with an embodiment of the present technology.

FIG. 2 is an isometric view of a structural frame 1100 (also referred to as a "structural H-frame" or an "H-frame") of a UAV in accordance with an embodiment of the present technology. The H-frame 1100 includes a wing spar 112 and boom carriers 212. In some embodiments the wing spar 112 and the boom carriers 212 may be made of carbon fiber, hard plastic, aluminum, light metal alloys, or other materials. The wing spar 112 and the boom carriers 212 may be connected with clamps 114. The wing spar 112 may include predrilled holes 145 for horizontal propulsion units, and the boom carriers 212 may include predrilled holes (hidden by motor mounts 242 in this view) for vertical propulsion units.

In some embodiments, the fuselage 310 is removeably attached to the H-frame (e.g., attached to the wing spar 112 by clamps 114). The removable attachment of the fuselage 310 may improve quality and or modularity of the UAV. For example, electrical/mechanical components of the fuselage 310 may be tested before attaching the fuselage 310 to the H-frame and/or before attaching PCBs 214 to the boom carriers 212, therefore eliminating defective parts/subassemblies prior to completing the UAV. Furthermore, different types/models of the fuselage 310 may be attached to the H-frame, therefore improving the modularity of the design. The electrical cabling and routing of the PCBs is discussed with reference to FIG. 3 below.

Figure 3:
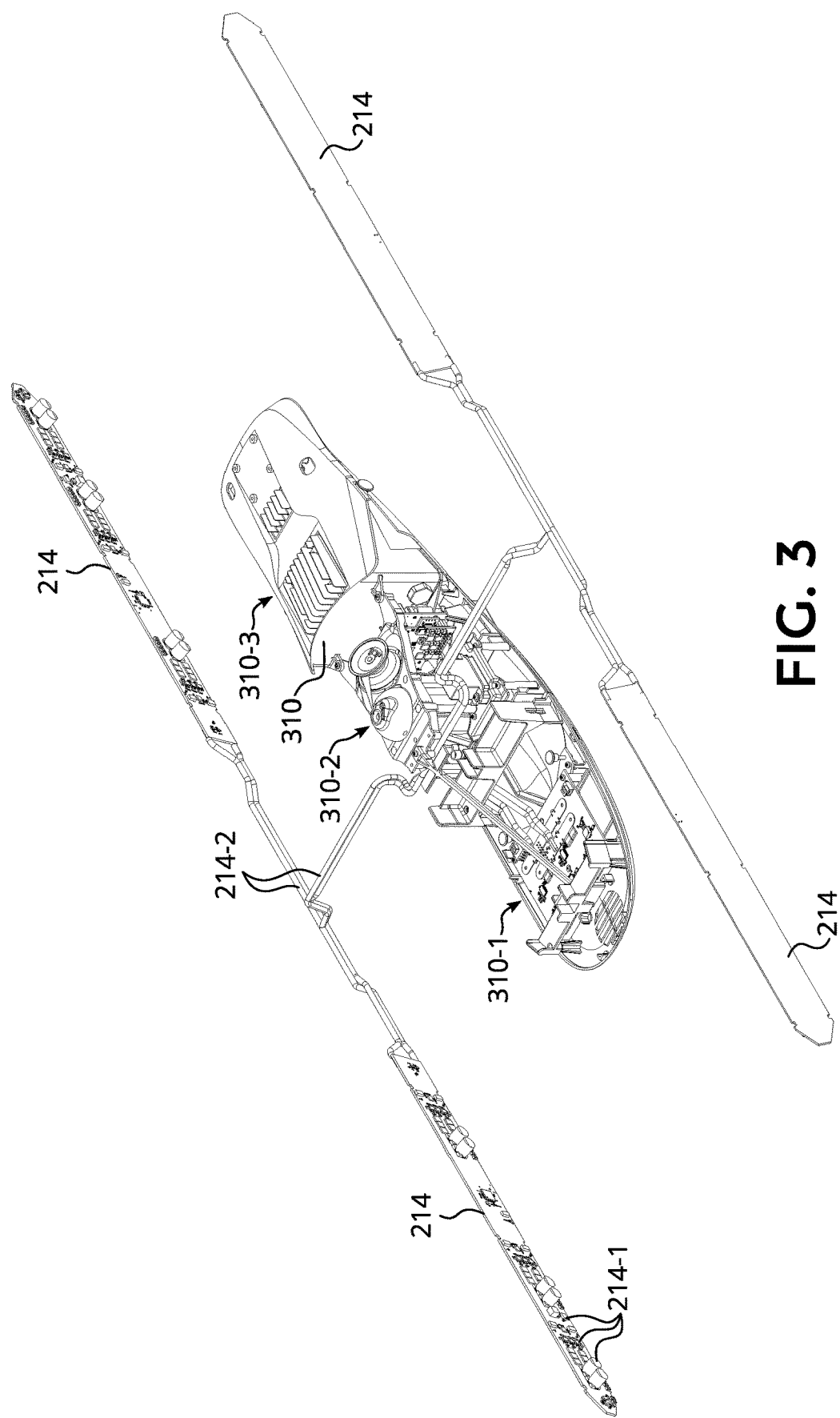
FIG. 3 is an isometric view of cable routing of a UAV in accordance with an embodiment of the present technology.

FIG. 3 is an isometric view of cable routing of a UAV in accordance with an embodiment of the present technology. The power and/or control signals from the fuselage 310 may be routed through cables 214-2 to PCBs 214. In the illustrated embodiment, the UAV has four PCBs, but other numbers of PCBs are also possible. For example, the UAV may include two PCBs, one per the boom. The PCBs carry electronic components 214-1, for example, power converters, controllers, memory, passive components, etc. In operation, the propulsion units of the UAV are electrically connected to the PCBs.

Figure 4:
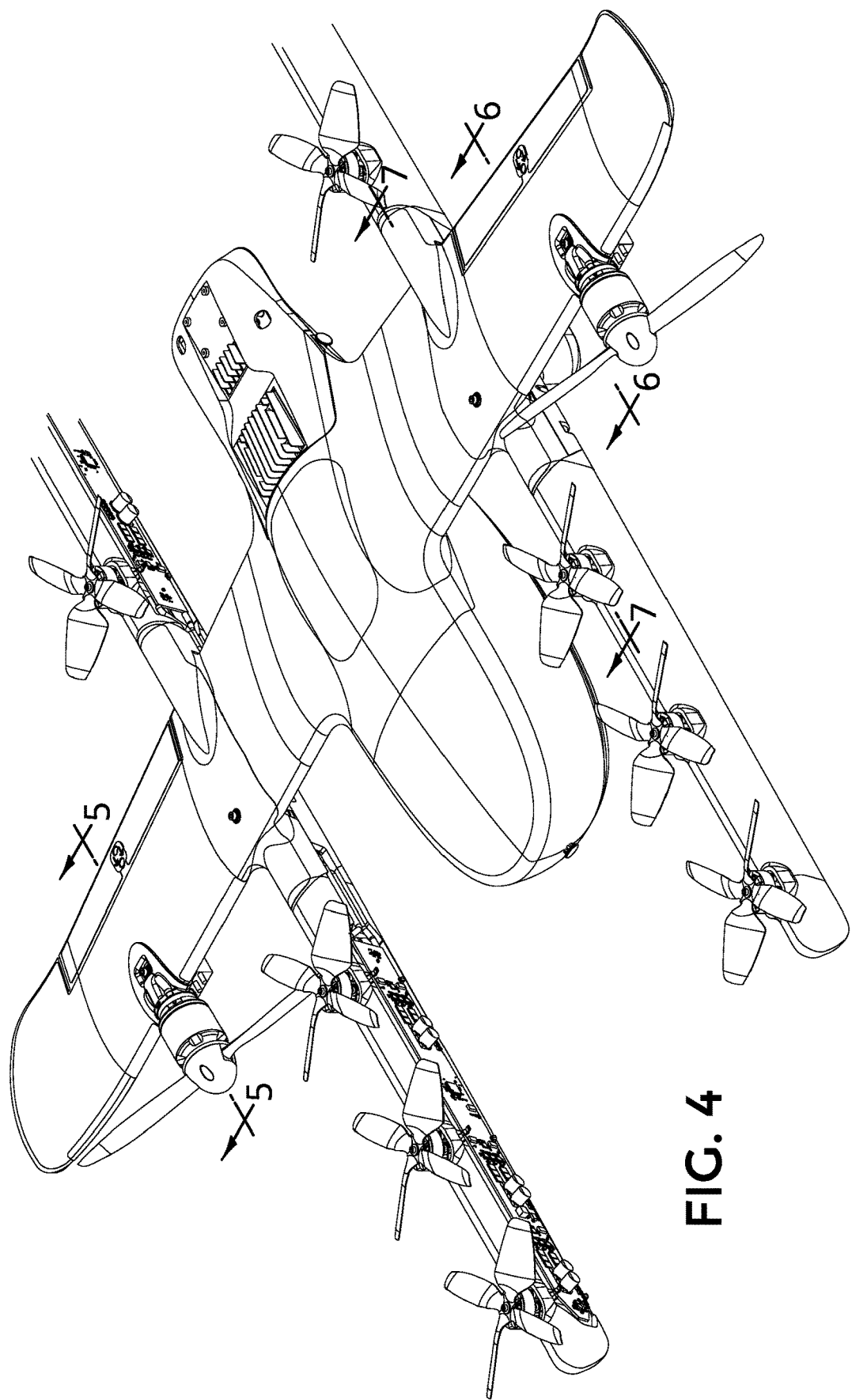
FIG. 4 is a partial isometric view of a UAV in accordance with an embodiment of the present technology.

FIG. 4 is a partial isometric view of a UAV in accordance with an embodiment of the present technology. FIG. 4 includes cross-sections 5-5, 6-6, and 7-7. The individual cross-sections are discussed with reference to FIGS. 5-7 below.

Figure 5:
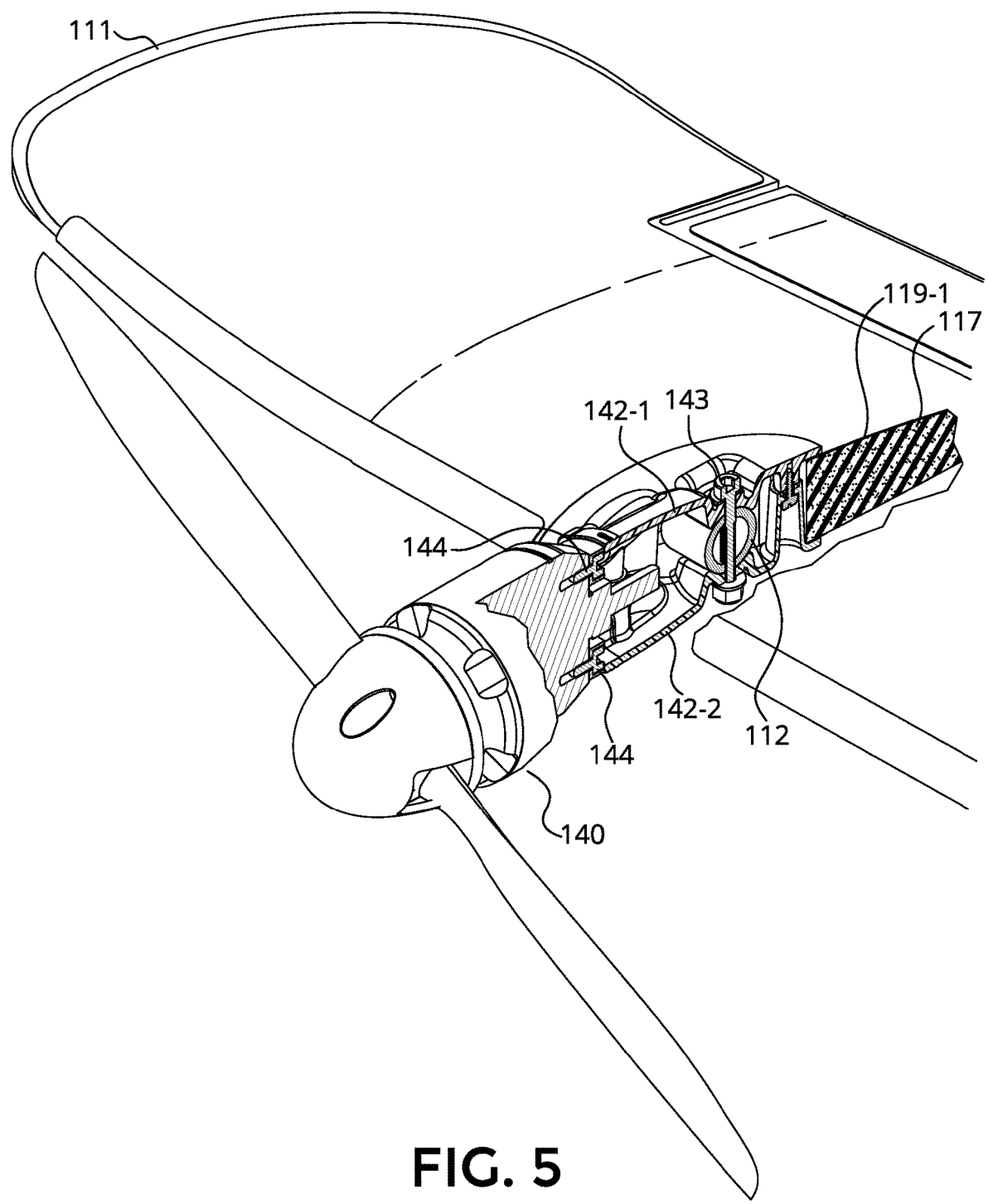
FIG. 5 is a cross-sectional view 5-5 of the UAV shown in FIG. 4.

FIG. 5 is a cross-sectional view 5-5 of the UAV shown in FIG. 4. In some embodiments, motor mounts 142 include a two-part C-clamp having an upper segment 142-1 and a lower segment 142-2. In other embodiments, the motor mounts 142 may include different types of clamps. The two segments of the motor mount 142 may be attached to the wing spar by a fastener 143, for example, a nut and bolt combination. In some embodiments, the wing spar 112 includes pre-drilled holes for the fasteners 143.

The horizontal propulsion unit 140 may be attached to the motor mount 142 by fasteners 144. In some embodiments, replacement of the propulsion unit is facilitated by relatively easy removal of the fasteners 144. Furthermore, the same motor mounts 142 may be suitable for different types of the horizontal propulsion units 140, thus facilitating the modularity of the UAV.

Figure 5A:
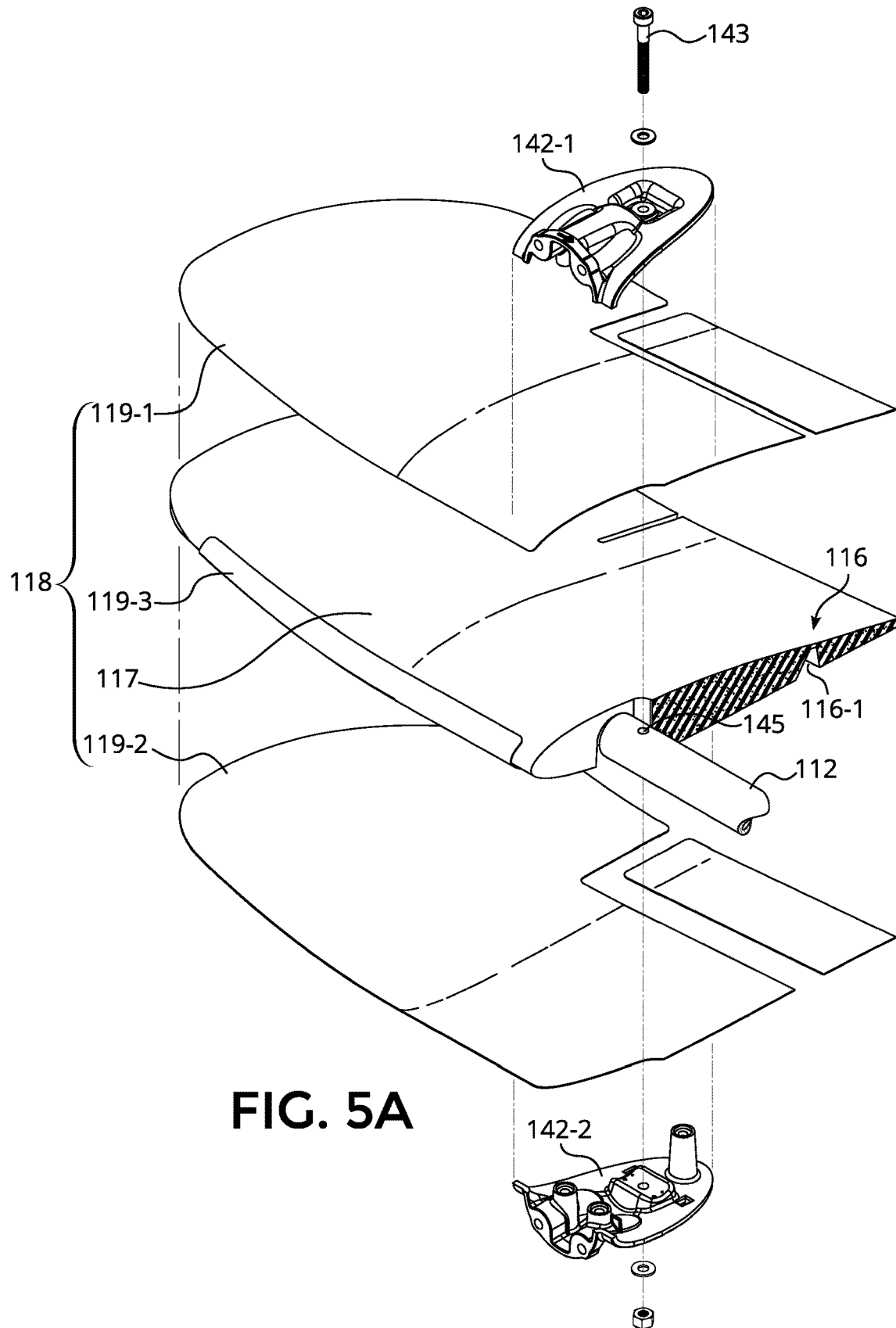
FIG. 5A is an exploded cross-sectional view 5-5 of the UAV shown in FIG. 4.

FIG. 5A is an exploded cross-sectional view 5-5 of the UAV shown in FIG. 4. During the assembly, the segments 142-1 and 142-2 of the motor mounts 140 may be slid over the wing skins 119-1 and 119-2; aligned with the hole 145 in the wing spar 112; and then tightened with the fastener 143 through the wing spar and clamped over the wing skins. In some embodiments, the wing skins 119-1 and 119-2 may be made of hard plastic to prevent or at least minimize compression of a wing body 117, which may be made of closed cell foam or other light and relatively soft polymer.

The upper and lower wing skins 119-1/119-2 may be connected with a wing skin clip 119-3 (e.g., structural tape, hard plastic element, metal clip, etc.). In some embodiments, connecting the wing skins into a unitary structure improves structural integrity (e.g., a resistance against torsion) of the wing. In other embodiments, forming the upper and lower portions of the wing skin, as well as a connector segment (i.e., in place of wing skin clip 119-3), as a single, unitary structure (not shown) also may improve structural integrity.

In some embodiments, the upper wing skin 119-1 may be pre-assembled with the wing body 117 by, for example, gluing. After assembling the wing shell 118 with the wing spar 112, the horizontal propulsion units may be connected to their corresponding cabling using the space under the wing. Next, the lower wing skin 119-2 may be attached to the wing body 117 by, for example, gluing.

FIG. 6 is a cross-sectional view 6-6 of the UAV shown in FIG. 4. In some embodiments, the wing shell includes an aileron 116 for controlling the roll of the UAV. In some embodiments, the aileron 116 may be formed by weakening the wing body 117 at the trailing edge of the wing. For example, a groove 116-1 may form a flexible connection between the aileron 116 and the rest of the wing body 117.

FIG. 7 is a cross-sectional view 7-7 of the UAV shown in FIG. 4. The plane of the cross-section passes through the axis of the boom carrier 212. The boom carrier 212 may carry several vertical propulsion units 240 along its length. Furthermore, the cables and the PCBs (not shown) also may be added to the boom carrier prior to attaching the boom shell 218 for easier electrical routing and testing of the UAV. In some embodiments, the boom shells 218 may be formed (e.g., molded) using light polymers (e.g., closed cell foam). At the assembly time, the boom shells 218 may be adhesively attached to the boom carrier by adhesive elements, for example, adhesive film, adhesive tape, double-sided adhesive tape, glue, etc.

In some embodiments, the motor mounts 242 are preassembled onto the boom carrier 212 prior to attaching a boom shell 218 to the boom carrier. The vertical propulsion units 240 may be attached to the motor mounts 242 with fasteners 216, for example, the bolt and nut combination. In some embodiments, holes 245 are pre-drilled through the boom carrier 212 for easier assembly.

Figure 8:
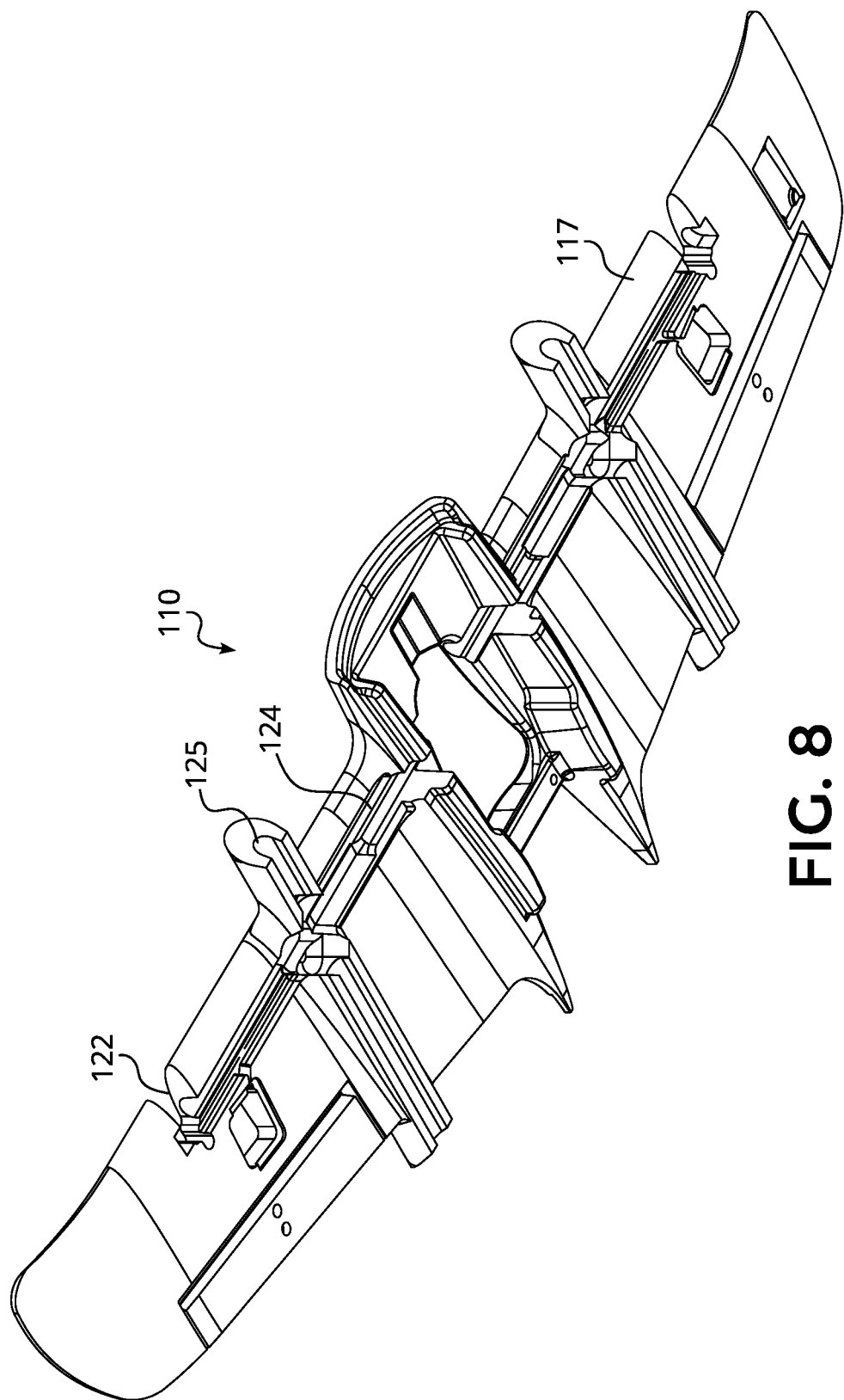
FIG. 8 is an isometric view of a wing in accordance with an embodiment of the present technology.

FIG. 8 is an isometric view of the wing 110 in accordance with an embodiment of the present technology. In some embodiments, the wing 110 is formed (e.g., molded) using light polymers (e.g., closed cell foam). The pre-made wing 110 may include several grooves and/or opening that eliminate or at least reduce the need to cut out the portions of the wing at the assembly time for, for example, cable routing, PCB attachment, motor mount attachment, fit with the H-frame, etc. For example, the wing 110 may include grooves 124 for mating with the wing spar 112 and grooves 125 for mating with the boom carriers 212. Furthermore, the wing 110 may include notches 122 for the motor mount for the horizontal propulsion units to enable self-fixturing during assembly. As a result, in at least some embodiments, attachment of the components and routing of the cables of the UAV requires less time and effort. In some embodiments, the pre-made wings 110 having differing shapes and/or sizes may be used over the same H-frame.

Figure 9:
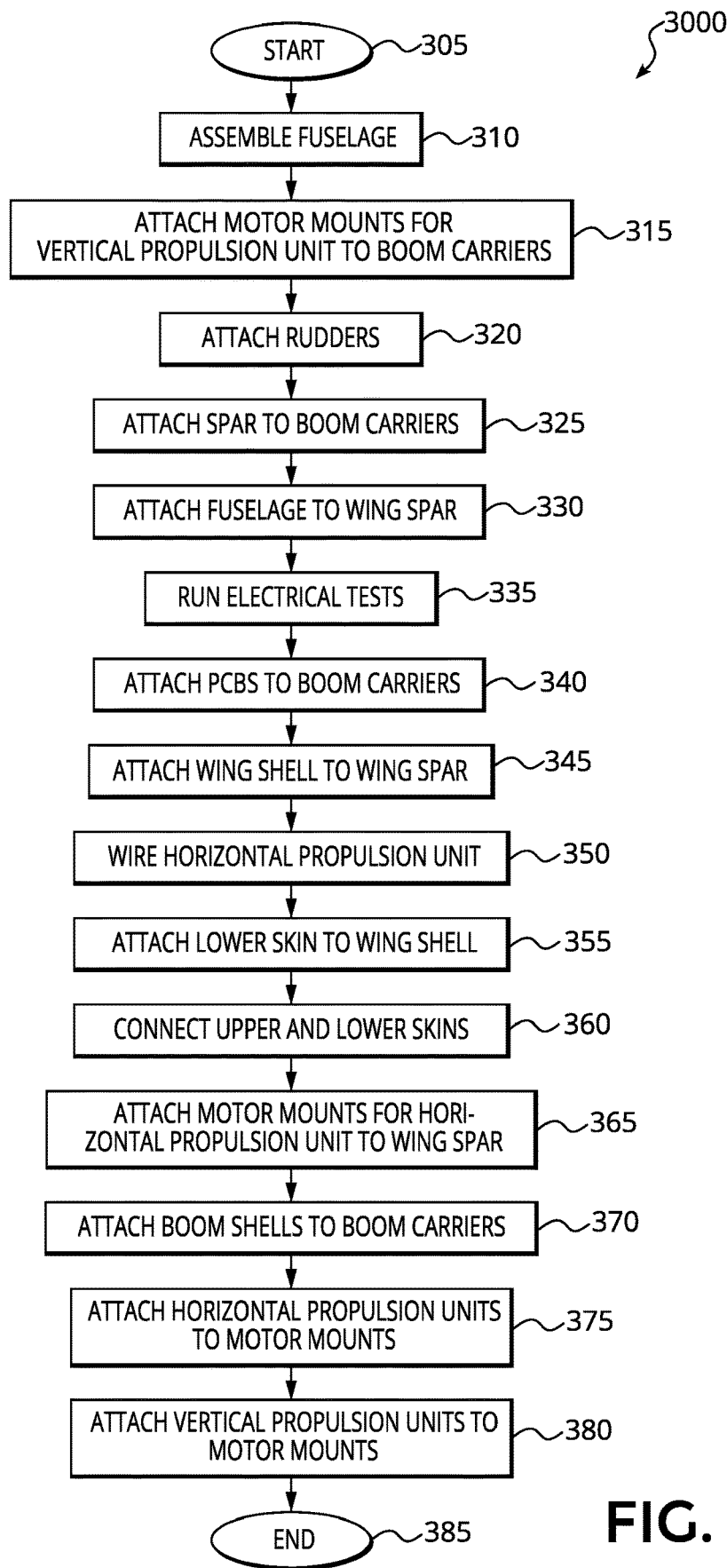
FIG. 9 is a flow diagram of a method of assembly in accordance with an embodiment of the present technology.

FIG. 9 is a flow diagram of a method of assembly in accordance with an embodiment of the present technology. In some embodiments, the method may include additional steps or may be practiced without all steps illustrated in the flow chart. Furthermore, in some embodiments, the order of the steps listed may be changed.

The method starts in step 305, and continues to step 310. In step 310, the fuselage is assembled. In some embodiments, the fuselage may include compartments, for example, the battery compartment, the avionics compartment, an additional battery compartment and/or the payload compartment. In some embodiments, the fuselage may be electrically/mechanically tested before assembling it with the UAV. In other embodiments, one compartment of the fuselage may be attached to the wing spar first, followed by attaching the remaining compartments to the already-attached compartment and/or to the spar.

In step 315, the motor mounts for the vertical propulsion units are attached to the boom carriers. In some embodiments, the boom carriers may include predrilled holes for attaching the motor mounts.

In step 320, the rudders are attached to the boom carriers. Generally, the rudders improve the yaw control of the UAV.

In step 325, the wing spar and the boom carriers are connected to form the H-frame. In some embodiments, the individual wing spar and/or the individual boom carrier may include several structural elements. For example, the wing spar may comprise several carbon tubes for, for example, improved structural integrity.

In step 330, the fuselage is attached to the wing spar. The size/type of the fuselage may be selected based on, for example, type of the task that the UAV needs to perform. Such a variability of the size/type of the fuselage increases the modularity of the UAV design.

In step 335, the avionics, power supply, cable connections, etc., may be tested. As explained above, the testing of the fuselage may have already been partially or entirely performed in the earlier assembly steps.

In step 340, the PCBs may be attached to the boom carriers. Furthermore, the cables may be routed and dressed throughout the UAV.

In step 345, the wing shell may be attached to the wing spar by, for example, gluing. In some embodiments, the wing shell may already include the pre-assembled upper wing skin.

In step 350, the horizontal propulsion units may be wired. In some embodiments, the horizontal propulsion units may also be tested at this step, before being attached to the wing.

In step 355, the lower wing skin may be attached to the wing shell by, for example, gluing. In many embodiments, the cable routing and dressing, and attaching the PCB to the boom are at least partially completed before this step.

In step 360, the upper and lower skins may be connected by one or more wing skin clips. Generally, the wing skin clips improve the rigidity of the wing shell.

In step 365, the motor mounts for horizontal propulsion units are attached to the wing spar. In some embodiments, a motor mount may be a two-piece C-shell that clamps on the upper and lower skins of the wing shell. In some embodiments, the motor mount is attached with the wing spar with a single fastener.

In step 370, the boom shells are attached to the boom carriers. In some embodiments, by this step most or all of the cabling and PCB attachments has been completed without the boom shells standing in the way.

In step 375, the horizontal propulsion units are attached to motor mounts by, for examples, fasteners. In some embodiments, the horizontal propulsion units may have already been electrically connected and tested.

In step 380, the vertical propulsion units are attached to motor mounts. In some embodiments, the vertical propulsion units may have already been electrically connected and tested. The method ends in step 385.

Many embodiments of the technology described above may take the form of computer-executable or controller-executable instructions, including routines executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. Of course, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. A method for assembling an Unmanned Autonomous Vehicle (UAV), comprising:
   connecting a wing spar with boom carriers to form an H-frame, wherein the wing spar provides first mounting locations for securing horizontal propulsion units, and wherein the boom carriers provide second mounting locations for securing vertical propulsion units;
   attaching a fuselage body to the wing spar;
   attaching a pre-formed wing shell to the H-frame; and
   attaching pre-formed boom shells to their corresponding boom carriers, wherein the H-frame provides a structural frame for mounting the pre-formed wing shell and the pre-formed boom shells, and wherein the pre-formed wing shell includes grooves for housing the wing spar and the boom carriers.

2. The method of claim 1, wherein the boom carriers and the wing spar are connected with clamps.

3. The method of claim 1, wherein the pre-formed wing shell comprises:
a wing body;
an upper wing skin; and
a lower wing skin.

4. The method of claim 3, wherein the upper and lower wing skins are permanently attached to the wing body by adhesion.

5. The method of claim 1, wherein the pre-formed wing shell comprises a wing body and an upper wing skin, the method further comprising:
attaching a lower wing skin to the wing body after attaching the pre-formed wing shell to the H-frame.

6. The method of claim 5, further comprising:
after attaching the lower wing skin to the wing body, connecting the upper wing skin and the lower wing skin with a wing skin clip.

7. The method of claim 3, wherein attaching the pre-formed wing shell to the H-frame includes adhering the wing body to the wing spar.

8. The method of claim 4, further comprising:
attaching at least one motor mount for horizontal propulsion units to the pre-formed wing shell.

9. The method of claim 8, wherein an individual motor mount for a horizontal propulsion unit comprises:
a 2-piece C-shell, and
a fastener protruding through the C-shell and through the wing spar.

10. The method of claim 9, wherein attaching the at least one motor mount comprises:
sliding the 2-piece C-shell over the upper and lower wing skins; and
clamping the 2-piece C-shell to the pre-formed wing shell by tightening the 2-piece C-shell.

11. The method of claim 8, further comprising:
attaching one of the horizontal propulsion units to the at least one motor mount.

12. The method of claim 1, further comprising:
attaching a plurality of printed circuit boards (PCBs) to the boom carriers.

13. The method of claim 12, wherein the PCBs are attached with electrical cables to the fuselage.

14. The method of claim 12, further comprising:
after attaching the PCBs to the boom carriers, attaching pre-formed boom shells to the boom carriers.

15. The method of claim 14, wherein the pre-formed boom shells are adhered to their corresponding boom carriers.

16. The method of claim 14, wherein the PCBs remain at least partially exposed after attaching the pre-formed boom shells to the boom carriers.

17. The method of claim 12, further comprising:
attaching vertical motor mounts to the boom carriers; and
attaching vertical propulsion units to the vertical motor mounts.

18. The method of claim 17, further comprising:
electrically connecting the vertical propulsion units to the PCBs; and
running electrical tests of the vertical propulsion units.

19. The method of claim 1, wherein the wing spar is a carbon fiber tube with pre-drilled holes.

20. The method of claim 1, wherein the boom carriers are carbon fiber tubes with pre-drilled holes.

21. The method of claim 1, further comprising:
prior to attaching the fuselage body to the wing spar, testing electrical and/or mechanical components of the fuselage body.

22. The method of claim 1, further comprising:
replacing the fuselage body with another fuselage body while keeping the same H-frame.

23. A method for assembling an Unmanned Autonomous Vehicle (UAV), comprising:
connecting a wing spar with boom carriers to form an H-frame, wherein the wing spar provides first mounting locations for securing horizontal propulsion units, and wherein the boom carriers provide second mounting locations for securing vertical propulsion units;
attaching a fuselage body to the wing spar;
attaching a pre-formed wing shell to the H-frame;
attaching pre-formed boom shells to the boom carriers; and
attaching at least one motor mount for the horizontal propulsion units to the pre-formed wing shell, wherein an individual motor mount for a given one of the horizontal propulsion units comprises:
a 2-piece C-shell, and
a fastener protruding through the 2-piece C-shell and through the wing spar,
wherein the H-frame provides a structural frame for mounting the pre-formed wing shell and the pre-formed boom shells, wherein the pre-formed wing shell comprises:
a wing body;
an upper wing skin; and
a lower wing skin,
and wherein the upper and lower wing skins are permanently attached to the wing body by adhesion.

24. The method of claim 23, wherein attaching the at least one motor mount comprises:
sliding the 2-piece C-shell over the upper and lower wing skins; and
clamping the 2-piece C-shell to the pre-formed wing shell by tightening the 2-piece C-shell.

25. The method of claim 23, further comprising:
attaching a plurality of printed circuit boards (PCBs) to the boom carriers; and
after attaching PCBs to the boom carriers, attaching the pre-formed boom shells to the boom carriers.

26. The method of claim 25, wherein the PCBs remain at least partially exposed after attaching the pre-formed boom shells to the boom carriers.

* * * * *